US012789250B2

(12) United States Patent
Tsukada et al.

(10) Patent No.: US 12,789,250 B2
(45) Date of Patent: Nov. 10, 2026

(54) SQUARE CAN MANUFACTURING METHOD AND SQUARE CAN MANUFACTURING APPARATUS

(71) Applicant: Toyo Seikan Co., Ltd., Tokyo (JP)

(72) Inventors: Kazuhiko Tsukada, Yokohama (JP); Kei Oohori, Yokohama (JP); Tatsuya Osafune, Yokohama (JP); Yousuke Ogawa, Yokohama (JP); Takanori Nakagawa, Yokohama (JP); Ryuji Onuki, Yokohama (JP); Ryosuke Hanada, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 169 days.

(21) Appl. No.: 18/890,192

(22) Filed: Sep. 19, 2024

(65) Prior Publication Data

US 2025/0010352 A1 Jan. 9, 2025

Related U.S. Application Data

(63) Continuation of application No. PCT/JP2023/007711, filed on Mar. 2, 2023.

(30) Foreign Application Priority Data

Mar. 31, 2022 (JP) ................................ 2022-058022

(51) Int. Cl.
*B21D 51/26* (2006.01)
*B21D 22/26* (2006.01)
(Continued)

(52) U.S. Cl.
CPC ...... *B21D 51/2646* (2013.01); *H01M 50/103* (2021.01)

(58) Field of Classification Search
CPC .... B21D 51/2646; B21D 22/28; B21D 22/30; B21D 22/26; B21D 24/005
See application file for complete search history.

(56) References Cited

U.S. PATENT DOCUMENTS

| | | | |
|---|---|---|---|
| 2003/0017389 A1 | 1/2003 | Kasahara et al. | |
| 2011/0206983 A1 | 8/2011 | Hano et al. | |
| 2023/0124823 A1 | 4/2023 | Fukunaga et al. | |

FOREIGN PATENT DOCUMENTS

| | | | |
|---|---|---|---|
| CN | 102163699 A | 8/2011 | |
| CN | 106463655 A * | 2/2017 | ............ B21D 51/26 |

(Continued)

OTHER PUBLICATIONS

English translate (CN106463655A), retrieved date May 4, 2026.*

(Continued)

*Primary Examiner* — Mohammed S. Alawadi
(74) *Attorney, Agent, or Firm* — WHDA, LLP

(57) ABSTRACT

Provided are a square can manufacturing method and a square can manufacturing apparatus. The square can manufacturing method includes a shape correction step of correcting the shape of an intermediate molded product, and in the shape correction step, a distance in a short side direction between planned long side wall parts of the intermediate molded product is expanded by pushing the planned long side wall parts outward in the short side direction by a long side wall pressing part of a shape correction punch inserted in the intermediate molded product, and a planned bottom wall part of the intermediate molded product is planarized by sandwiching the planned bottom wall part between a bottom wall pressing part of the shape correction punch inserted in the intermediate molded product and a bottom wall pressing member disposed on an outer surface side of the planned bottom wall part.

4 Claims, 10 Drawing Sheets

(51) Int. Cl.

| | |
|---|---|
| ***B21D 22/28*** | (2006.01) |
| ***B21D 22/30*** | (2006.01) |
| ***B21D 24/00*** | (2006.01) |
| ***H01M 50/103*** | (2021.01) |

(56) References Cited

FOREIGN PATENT DOCUMENTS

| | | | | |
|---|---|---|---|---|
| JP | H02192828 A | 7/1990 | | |
| JP | 2002164023 A | 6/2002 | | |
| JP | 2003077524 A | 3/2003 | | |
| JP | 4702843 B2 | 6/2011 | | |
| JP | 2012210641 A | 11/2012 | | |
| JP | 2013128986 A | 7/2013 | | |
| JP | 6218895 B2 | * | 10/2017 | ............ B21D 51/26 |
| JP | 2018051575 A | 4/2018 | | |
| WO | 2021/192622 A1 | 9/2021 | | |

OTHER PUBLICATIONS

International Search Report dated May 16, 2023, issued in counterpart application No. PCT/JP2023/007711. (2 pages).

Written Opinion of the International Searching Authority (Form PCT/ISA/237) dated May 16, 2023, issued in counterpart International Application No. PCT/JP2023/007711. (3 pages).

* cited by examiner

SQUARE CAN MANUFACTURING METHOD AND SQUARE CAN MANUFACTURING APPARATUS

TECHNICAL FIELD

The disclosure relates to a square can manufacturing method and a square can manufacturing apparatus for forming a square can, and particularly to a square can manufacturing method and a square can manufacturing apparatus for a square can that is used as a case of a lithium-ion battery.

BACKGROUND

In the related art, as a manufacturing method for a metal square can including a bottom wall and a square cylindrical part, manufacturing a square can by performing drawing or drawing and ironing multiple times on a blank is known (see, for example, Japanese Patent Application Laid-Open No. 2018-51575). In addition, in drawing and ironing that are performed as a final step of the above-mentioned drawing or drawing and ironing, it is also known to use a punch including a punch machining outer peripheral surface formed in a substantially rectangular cross-sectional shape and a die including a die machining through hole formed in the same substantially rectangular cross-sectional shape in consideration of the shape such as the external dimension and internal dimension of a square cylindrical part of the final molded product.

SUMMARY

In the case where a square cylindrical part 165 including a long side wall 166 and a short side wall 167 is formed through drawing and ironing as illustrated in FIG. 10; however, the degree (ratio) of ironing is strong at the long side wall 166 (particularly the center portion side in the long side direction) while the degree of drawing is strong in the vicinity of an R-shaped corner wall 168 in the square cylindrical part 165, and consequently a material flow differs between the parts, which results in a complicated internal stress state in the vicinity of the boundary between the vicinity of the corner wall 168 with the strong degree of drawing and the long side wall 166 with the strong degree of ironing. As a result, a so-called canning phenomenon in which the center portion of each long side wall 166 in the long side direction is recessed inward in the short side direction may occur as illustrated in FIG. 10.

Such a canning phenomenon is significant in the case where the flatness ratio (the ratio of the long side direction dimension with respect to the short side direction dimension) of the square cylindrical part 165 is high, and further, in the case of a product (square can) that is used by finally cutting off a flange part formed on the tip end side of the square cylindrical part 165 in a middle stage of the molding, the deformation due to the canning phenomenon is significant because of the removal of the flange part that serves a function of suppressing the strain deformation.

On the other hand, swell of the bottom wall to the outside (lower side) may occur in the middle of formation of a square can through the above-described drawing or drawing and ironing, such swell of the bottom wall to the outside may be unacceptable depending on the application of the square can such as when the square can is used for a lithium-ion battery case and the like that require a high degree of shape accuracy.

To solve the above-mentioned problems, an object of the disclosure is to provide a square can manufacturing method and a square can manufacturing apparatus that can improve the shape accuracy of the square can while suppressing the increase in manufacture burden.

To solve the above-mentioned problems, a square can manufacturing method of the disclosure is a method of manufacturing a square can including a bottom wall and a square cylindrical part with a pair of long side walls and a pair of short side walls, the square can manufacturing method including correcting a shape of an intermediate molded product, in which in the correcting, a distance in a short side direction between planned long side wall parts of the intermediate molded product is expanded by pushing the planned long side wall parts outward in the short side direction by a long side wall pressing part of a shape correction punch inserted in the intermediate molded product, and a planned bottom wall part of the intermediate molded product is planarized by sandwiching the planned bottom wall part between a bottom wall pressing part of the shape correction punch inserted in the intermediate molded product and a bottom wall pressing member disposed on an outer surface side of the planned bottom wall part.

To solve the above-mentioned problems, a square can manufacturing apparatus of the disclosure is configured to manufacture a square can including a bottom wall and a square cylindrical part with a pair of long side walls and a pair of short side walls, the square can manufacturing apparatus including a shape correction unit configured to correct a shape of an intermediate molded product, in which the shape correction unit is configured to expand a distance in a short side direction between planned long side wall parts of the intermediate molded product by pushing the planned long side wall parts outward in the short side direction by a long side wall pressing part of a shape correction punch inserted in the intermediate molded product, and planarize a planned bottom wall part of the intermediate molded product by sandwiching the planned bottom wall part between a bottom wall pressing part of the shape correction punch inserted in the intermediate molded product and a bottom wall pressing member disposed on an outer surface side of the planned bottom wall part.

According to the disclosure, in the shape correction step of correcting the shape of the intermediate molded product, a distance in a short side direction between planned long side wall parts of the intermediate molded product is expanded by pushing the planned long side wall parts outward in the short side direction by a long side wall pressing part of a shape correction punch inserted in the intermediate molded product, and a planned bottom wall part of the intermediate molded product is planarized (made closer to a flat state) by sandwiching the planned bottom wall part between a bottom wall pressing part of the shape correction punch inserted in the intermediate molded product and a bottom wall pressing member disposed on an outer surface side of the planned bottom wall part. In this manner, the shape correction of the square cylindrical part and the shape correction of the bottom wall can be collectively performed in one step of sandwiching the planned bottom wall part with the shape correction punch and the bottom wall pressing member after the shape correction punch is inserted in the intermediate molded product, and thus the shape accuracy of the square can can be improved while suppressing the increase in manufacture burden.

In addition, during the drawing or the drawing and ironing for forming a square can, it is conceivable to suppress the outward swell of the bottom wall with a configuration in which the member disposed on the outside of the planned bottom wall part and the punch sandwich the planned bottom wall part of the intermediate molded product, but such a configuration needs to set a large amount of stroke of the punch for the drawing or the drawing and ironing, and needs a structure of moving also the member disposed on the outside of the planned bottom wall part to follow the movement of the punch, thus leading to increase in apparatus cost and reduction in manufacture speed. The disclosure, on the other hand, does not need such a structure, and therefore can avoid the increase in apparatus cost and reduction in manufacture speed.

DESCRIPTION OF EMBODIMENTS

A square can manufacturing method and a square can manufacturing apparatus 10 according to an embodiment of the disclosure are described below with reference to the drawings.

Square Can 60 (Final Molded Product)

First, a square can 60 that is a final molded product manufactured with the square can manufacturing method and the square can manufacturing apparatus 10 is composed of metal such as aluminum. In the present embodiment, the square can 60 is used as a case of a lithium-ion battery, and includes a bottom wall 61 with a plate shape (or a substantially plate shape) and a square cylindrical part 65 as illustrated in FIG. 1.

Figure 1:
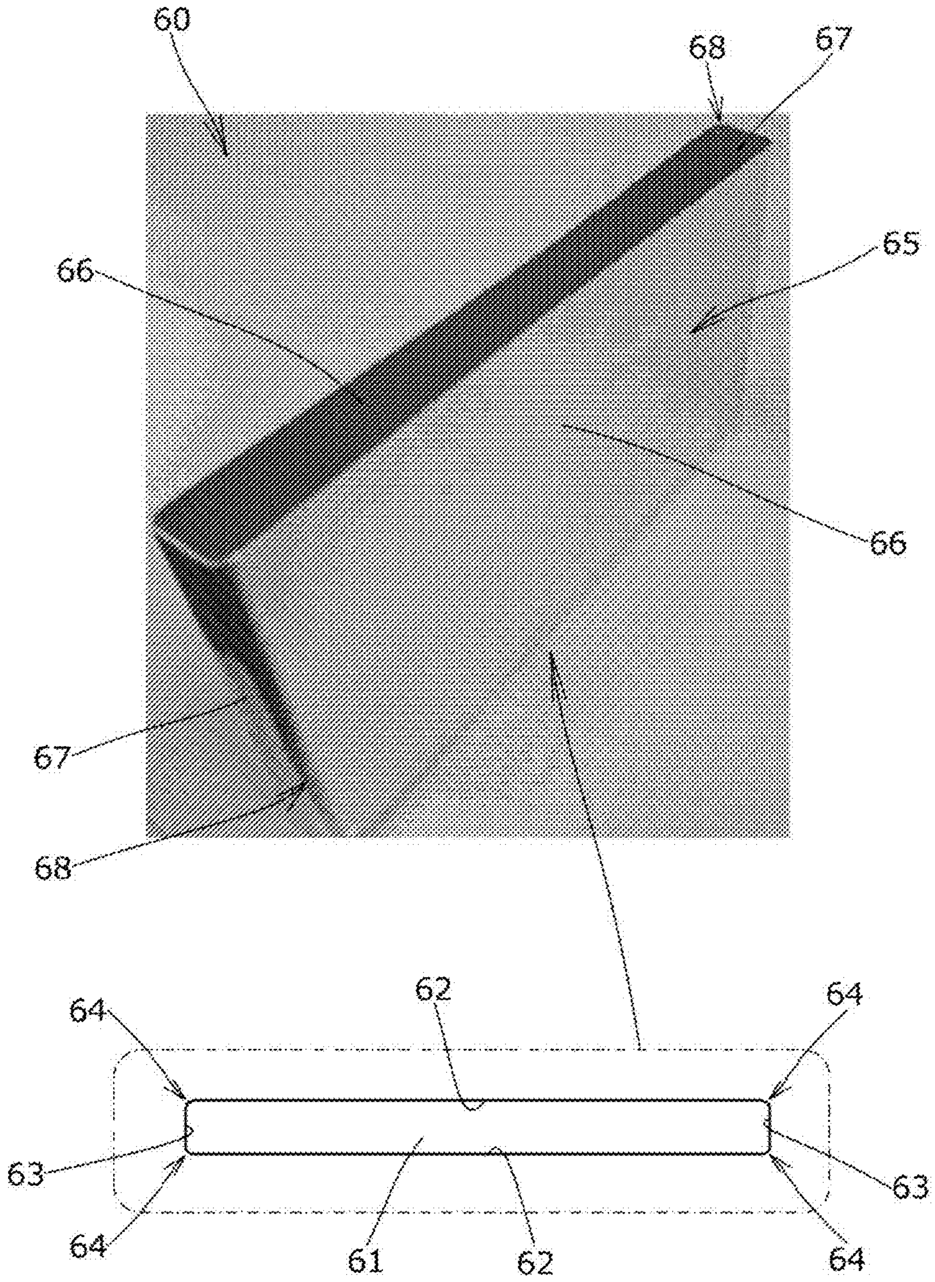
FIG. 1 is an explanatory diagram illustrating a square can that is a final molded product of a square can manufacturing method according to an embodiment of the disclosure.

As illustrated in FIG. 1, the bottom wall 61 is formed in a substantially quadrangular shape (or quadrangular shape) with a pair of bottom long side portions 62 and a pair of bottom short side portions 63 at its outer edge.

The bottom long side portion 62 is a portion linearly (or substantially linearly) extending along the long side direction.

The bottom short side portion 63 is a portion linearly (or substantially linearly) extending along the short side direction and forming an angle of 90 degrees between it and the bottom long side portion 62.

A bottom curved corner portion 64 that is convexly curved to the outer circumference side to smoothly connect the bottom long side portion 62 and the bottom short side portion 63 is formed between the bottom long side portion 62 and the bottom short side portion 63. In the present embodiment, each bottom curved corner portion 64 is formed with a curve of the same single R (single curvature radius).

As illustrated in FIG. 1, the square cylindrical part 65 includes a pair of long side walls 66 disposed to face each other in the short side direction, and a pair of short side walls 67 disposed to face each other in the long side direction.

As illustrated in FIG. 1, each long side wall 66 is a plate-shaped (or substantially plate-shaped) portion formed upright from the bottom long side portion 62, and the pair of the long side walls 66 is formed in parallel to each other.

As illustrated in FIG. 1, each short side wall 67 is a plate-shaped (or substantially plate-shaped) portion formed upright from the bottom short side portion 63 so as to form an angle of 90 degrees between it and the long side wall 66, and the pair of short side walls 67 is formed in parallel to each other.

Between the long side wall 66 and the short side wall 67, an R-shaped corner wall 68 convexly curved to the outer circumference side is formed upright from the bottom curved corner portion 64 to smoothly connect the long side wall 66 and the short side wall 67. In the present embodiment, each corner part wall 68 is formed with a curve of the same single R (single curvature radius).

Square Can Manufacturing Method

The square can manufacturing method is for manufacturing the square can 60, and, as illustrated in FIGS. 2A to 2C and FIGS. 3D to 3F, includes a blank preparation step of preparing a blank 60A, a coining step of performing coining at a predetermined place in the blank 60A, a first drawing step of performing a first drawing on the blank 60A having been subjected to the coining step, a second drawing step of performing a second drawing on a cup-shaped first intermediate molded product 60B having been subjected to the first drawing step, a drawing/ironing step of performing drawing and ironing on a second intermediate molded product 60C obtained through the second drawing step, and a shape correction step of correcting the shape of a third intermediate molded product 60D obtained through the drawing/ironing step.

Each step of the square can manufacturing method is described in detail below.

Figure 2A:
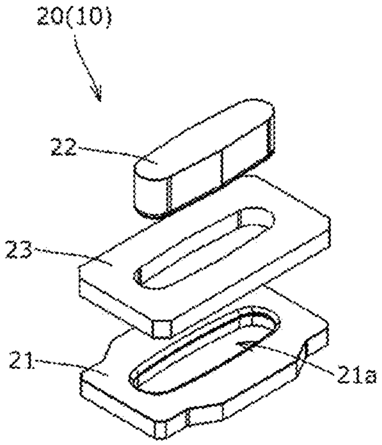
FIGS. 2A to 2C are explanatory diagrams illustrating each step of the square can manufacturing method.
Figure 2A:
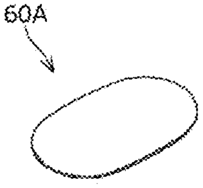

First, as illustrated in FIG. 2A, the blank preparation step is to form the blank 60A as a metal plate by performing punching on a strip plate made of metal such as aluminum.

Figure 2B:
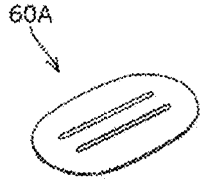

As illustrated in FIG. 2B, the coining step is to perform coining to reduce the sheet thickness by performing pressing in the sheet thickness direction at a predetermined place in the blank 60A.

In the present embodiment, the coining to reduce the sheet thickness is performed by performing pressing in the sheet thickness direction at a planned bottom wall part (the portion that is the bottom wall 61 in a state of a final molded product of the square can 60) of the blank 60A.

Figure 2C:
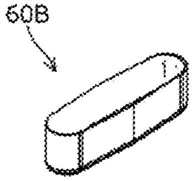

As illustrated in FIG. 2C, the first drawing step is to form the first intermediate molded product 60B with a cup shape by performing drawing on the blank 60A having been subjected to the coining step.

More specifically, in the first drawing step, in the state where the blank 60A is pushed from the upper side with a blank holder 23 that functions as a wrinkle suppression member to inhibit the formation of wrinkles in the blank 60A, the blank 60A is pushed (pulled) into a die machining through hole 21*a* formed in a die 21 from above with a punch 22 so as to cause plastic deformation of the blank 60A, and thus the first intermediate molded product 60B with a cup-shape is formed.

Figure 3D:
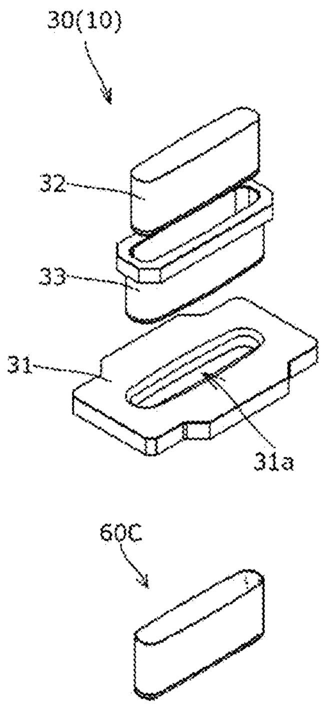
FIGS. 3D to 3F are explanatory diagrams illustrating each step of the square can manufacturing method.

As illustrated in FIG. 3D, the second drawing step is to form the second intermediate molded product 60C by performing the second drawing on the first intermediate molded product 60B obtained through first drawing step.

More specifically, in the second drawing step, in the state where the first intermediate molded product 60B is pushed from the upper side (inside) with a blank holder 33 that functions as a wrinkle suppression member to inhibit the formation of wrinkles in the second intermediate molded product 60C, the first intermediate molded product 60B is pushed (pulled) into a die machining through hole 31*a* formed in a die 31 with a punch 32 so as to cause plastic deformation of the first intermediate molded product 60B, and thus the second intermediate molded product 60C is formed.

Note that during this drawing, only (a part of) the first intermediate molded product 60B and the punch 32 are inserted into the die machining through hole 31*a*, but the blank holder 33 is not inserted.

Figure 3E:
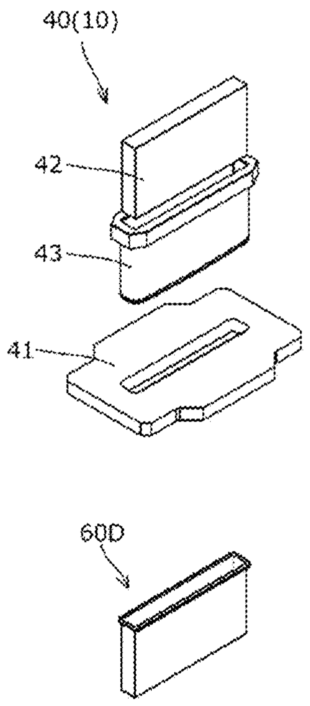

As illustrated in FIG. 3E, the drawing/ironing step is to form the third intermediate molded product 60D by performing drawing and ironing mainly on a planned cylindrical part 65C (a portion that is the square cylindrical part 65 in a state of a final molded product) of the second intermediate molded product 60C at a gap between a die machining through hole 41*a* formed in a die 41 and a punch 42 inserted into the die machining through hole 41*a*.

Note that in the drawing/ironing step, the drawing and ironing are also performed on a part of a planned bottom wall part 61C (a portion that is the bottom wall 61 in a state of a final molded product) of the second intermediate molded product 60C.

Figure 5:
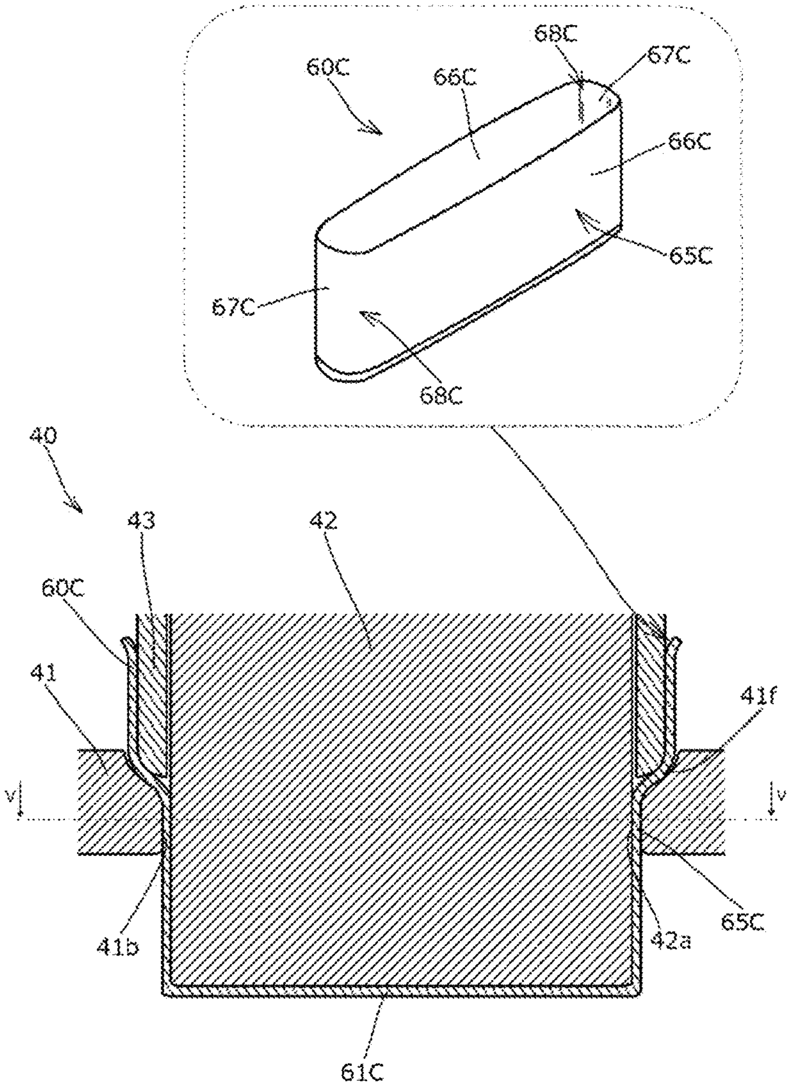
FIG. 5 is an explanatory diagram illustrating a state in drawing and ironing.

More specifically, as illustrated in FIG. 5, in the drawing/ironing step, the punch 42 is relatively moved with respect to the die 41 (in the present embodiment, the punch 42 and the blank holder 43 are moved with respect to the die 41 provided in the fixed state) in the state where the second intermediate molded product 60C is pushed from the upper side (inside) with a blank holder 43 that functions as a wrinkle suppression member to inhibit the formation of wrinkles in the third intermediate molded product 60D, such that the second intermediate molded product 60C is pushed (pulled) into the die machining through hole 41*a* with the punch 42 so as to cause plastic deformation of the second intermediate molded product 60C at the gap between a die machining inner peripheral surface 41*b* of the die machining through hole 41*a* and a punch machining outer peripheral surface 42*a* of the punch 42, and thus, the third intermediate molded product 60D is formed.

Note that during the above-described drawing and ironing, only (a part of) the second intermediate molded product 60C and the punch 42 are inserted into the die machining through hole 41*a*, but the blank holder 43 is not inserted.

Figure 4:
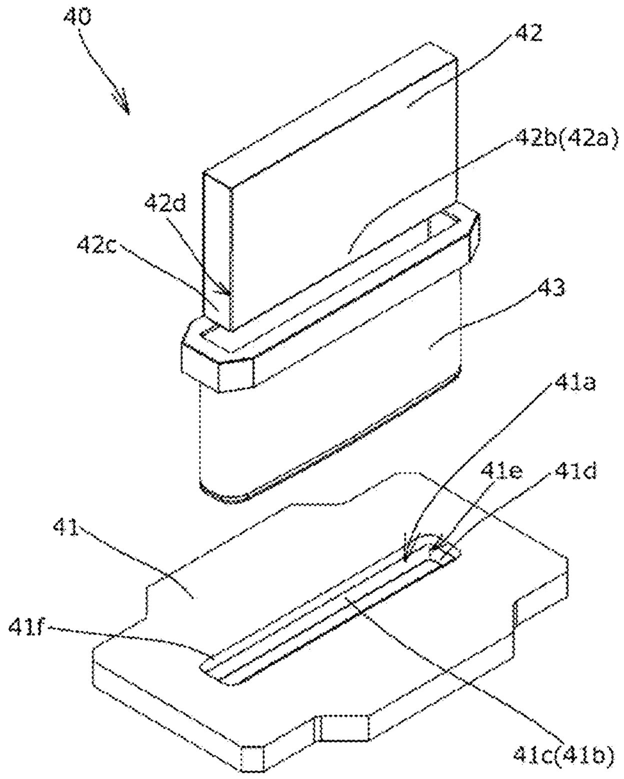
FIG. 4 is an explanatory diagram illustrating a drawing/ironing unit.

As illustrated in FIGS. 4 and 5, the die 41 used in the drawing/ironing step includes the die machining through hole 41*a* extending through the die 41 in the punch movement direction in the drawing and ironing (in the present embodiment, the up-down direction).

As illustrated in FIGS. 4 and 5, the die machining through hole 41*a* includes the die machining inner peripheral surface 41*b* formed as a surface parallel to the punch movement direction (up-down direction), and a tapered machining surface 41*f* formed on the near side (upward side) of the die machining inner peripheral surface 41*b* in the punch movement direction (up-down direction).

As illustrated in FIGS. 4 to 6B, the die machining inner peripheral surface 41*b* includes a pair of die long side wall machining parts 41*c* that performs machining on a planned long side wall part 66C (a portion that is the long side wall 66 in a state of a final molded product) of the second intermediate molded product 60C, and a pair of die short side wall machining parts 41*d* that performs machining on a planned short side wall part 67C (a portion that is the short side wall 67 in a state of a final molded product) of the second intermediate molded product 60C.

Figures 6A, 6B:
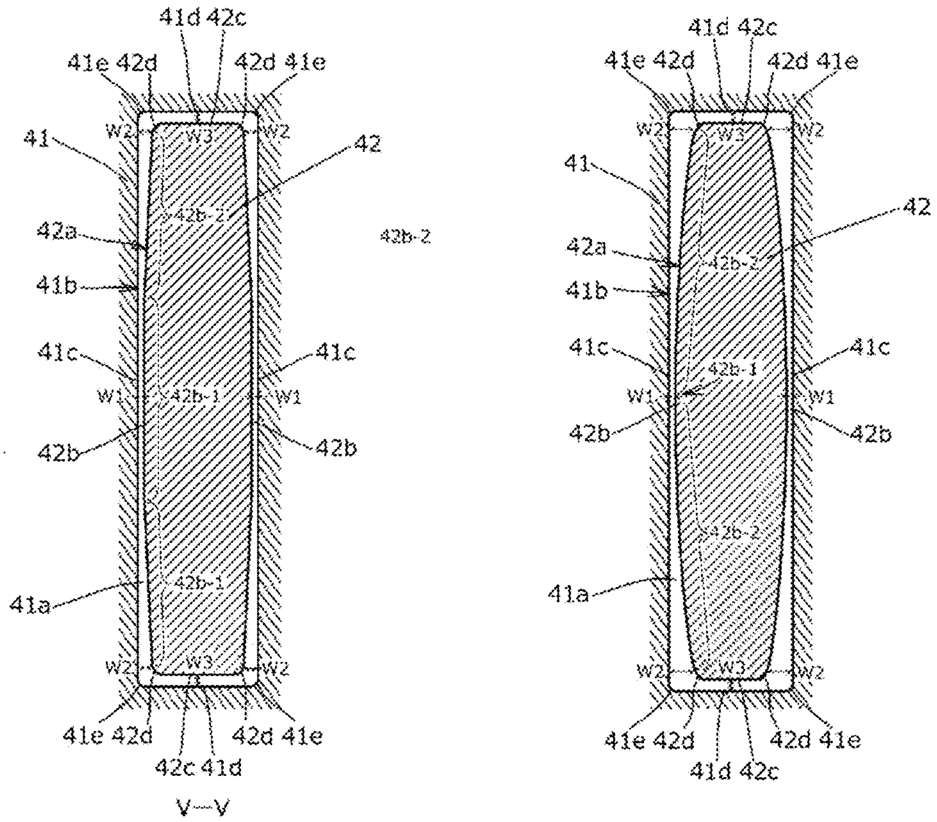
FIGS. 6A and 6B are explanatory diagrams illustrating a state where a punch is inserted in an unloaded state into a die machining through hole of the drawing/ironing unit, and a modification.

As illustrated in FIGS. 4 and 6A, each die long side wall machining part 41*c* is formed to linearly extend along the long side direction as viewed in the punch movement direction (up-down direction) (as viewed in a cross section of the die 41 taken along a plane perpendicular to the punch movement direction).

As illustrated in FIGS. 4 and 6A, each die short side wall machining part 41*d* is formed to linearly extend along the short side direction as viewed in the punch movement direction (up-down direction) (as viewed in a cross section of the die 41 taken along a plane perpendicular to the punch movement direction).

In addition, as illustrated in FIGS. 4 and 6A, a curved corner portion 41*e* convexly curved to the outer circumference side that smoothly connects the die long side wall machining part 41*c* and the die short side wall machining part 41*d* is formed between the die long side wall machining part 41*c* and the die short side wall machining part 41*d*. The curved corner portion 41*e* functions as a machining portion that performs machining near a planned corner wall part 68C (a portion that is the corner wall 68 of the square cylindrical part 65 in a state of a final molded product) of the second intermediate molded product 60C. In the present embodiment, each curved corner portion 41*e* is formed with a curve of the same single R (single curvature radius).

As illustrated in FIGS. 4 and 5, the tapered machining surface 41*f* is formed in an inclined manner such that the diameter decreases (the width in the long side direction and short side direction decreases) toward the depth side (downward side) in the punch movement direction (up-down direction).

As illustrated in FIGS. 4 to 6B, the punch 42 used in the drawing/ironing step includes the punch machining outer peripheral surface 42*a* formed as a surface parallel to the punch movement direction (up-down direction) as the outer peripheral surface that faces the inner surface of the die machining through hole 41*a* during the drawing and ironing.

As illustrated in FIGS. 4 and 6A, the punch machining outer peripheral surface 42*a* includes a pair of punch long side wall machining parts 42*b* that performs machining on the planned long side wall part 66C of the second intermediate molded product 60C in conjunction with the die long side wall machining part 41*c*, and a pair of punch short side wall machining parts 42*c* that performs machining on the planned short side wall part 67C of the second intermediate molded product 60C in conjunction with the die short side wall machining part 41*d*.

As illustrated in FIG. 6A, each punch long side wall machining part 42*b* includes a machining apex 42*b*-1 located on the outermost side in the short side direction in the punch long side wall machining part 42*b*, and an inclined part 42*b*-2 formed on both sides of the machining apex 42*b*-1 in the long side direction and inclined inward in the short side direction as it moves outward in the long side direction, and has an overall shape in which the center portion in the long side direction is swollen more outward in the short side direction than the both end sides in the long side direction.

As illustrated in FIG. 6A, the machining apex 42*b*-1 is formed at a center in the long side direction (or near a center in the long side direction) of the punch long side wall machining part 42*b*, and is formed as a portion linearly extending along the long side direction as viewed in the punch movement direction (up-down direction) (as viewed in a cross section of the punch 42 taken along a plane perpendicular to the punch movement direction) in the present embodiment.

Note that in the case where the machining apex 42*b*-1 is formed as a portion linearly extending in a cross-sectional view, the amount of deflection that occurs at the die long side wall machining part 41*c* due to the shaping reactive force in the drawing and ironing can be reduced in comparison with a case where the machining apex 42*b*-1 is formed in a point shape in a cross-sectional view as in the modification illustrated in FIG. 6B.

As illustrated in FIG. 1, the inclined part 42*b*-2 is formed as a linearly extending portion as viewed in the punch movement direction (up-down direction) (as viewed in a cross section of the punch 42 taken along a plane perpendicular to the punch movement direction).

As illustrated in FIG. 6A, each punch short side wall machining part 42*c* is formed to linearly extend along the short side direction as viewed in the punch movement direction (up-down direction) (as viewed in a cross section of the punch 42 taken along a plane perpendicular to the punch movement direction).

In addition, between the punch long side wall machining part 42*b* and the punch short side wall machining part 42*c*, a curved corner portion 42*d* convexly curved to the outer circumference side that smoothly connects the punch long side wall machining part 42*b* and the punch short side wall machining part 42*c* is formed. The curved corner portion 42*d* functions as a machining portion that performs machining on a region near the planned corner wall part 68C of the second intermediate molded product 60C in conjunction with the curved corner portion 41*e* of the die 41. In the present embodiment, each curved corner portion 42*d* is formed with a curve of the same single R (single curvature radius).

Note that in the drawing and ironing, ironing for reducing the sheet thickness is performed mainly on the planned long side wall part 66C of the second intermediate molded product 60C by pushing (pulling) the second intermediate molded product 60C to the gap between the die long side wall machining part 41*c* and the punch long side wall machining part 42*b*, and drawing is performed mainly on the planned corner wall part 68C (and the planned short side wall part 67C) of the second intermediate molded product 60C by pushing (pulling) the second intermediate molded product 60C to the gap between the die short side wall machining part 41*d* and the punch short side wall machining part 42*c*.

Figure 7A:
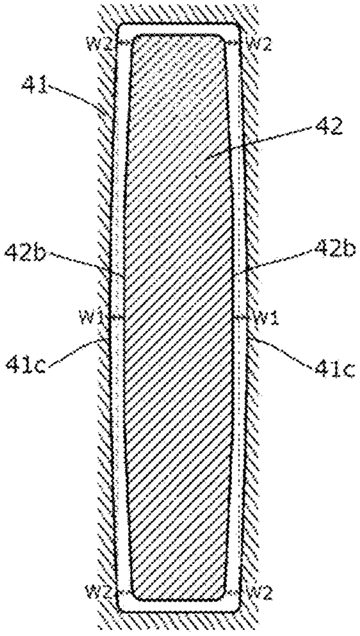
FIGS. 7A and 7B are explanatory diagrams illustrating a state of a die and a punch in drawing and ironing.

Here, in the case where the flatness ratio (the ratio of the long side direction dimension with respect to the short side direction dimension) of the die machining through hole 41*a* is large as in the present embodiment, deflection occurs in the die long side wall machining part 41*c* during the drawing and ironing as illustrated in FIG. 7A due to the shaping reactive force such that the center portion in the long side direction of the die long side wall machining part 41*c* moves outward in the short side direction, and as a result, a short side direction distance W1 between the die long side wall machining part 41*c* and the punch long side wall machining part 42*b* at the center portion in the long side direction of the die long side wall machining part 41*c* increases in comparison with a state where the punch 42 is inserted into the die machining through hole 41*a* in an unloaded state as illustrated in FIG. 6A.

Figure 7B:
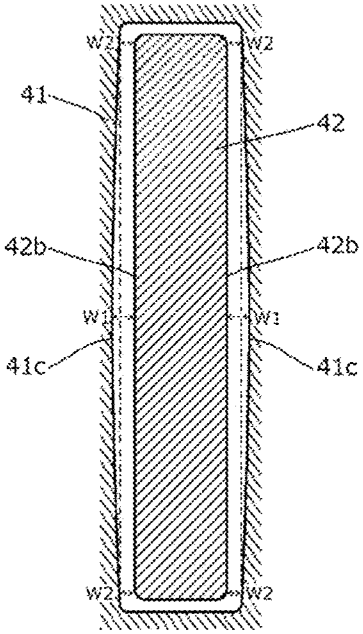

Therefore, as illustrated in FIG. 7B, when the short side direction distances W1 and W2 between the die long side wall machining part 41*c* and the punch long side wall machining part 42*b* are set constant such as when the die long side wall machining part 41*c* and the punch long side wall machining part 42*b* are formed to linearly extend along the long side direction, the thickness of the planned long side wall part 66C having been subjected to drawing and ironing is large at the center portion in the long side direction and decreases toward the both end portions in the long side direction, and as such the uniform thickness distribution in the planned long side wall part 66C cannot be achieved.

Conversely, in the present embodiment, as illustrated in FIG. 6A, the die long side wall machining part 41*c* and the punch long side wall machining part 42*b* are set such that in the state where the punch 42 is inserted into the die machining through hole 41*a* in an unloaded state (in other words, the state where the second intermediate molded product 60C is not interposed between the die long side wall machining part 41*c* and the punch long side wall machining part 42*b*, and no shaping reactive force is applied to the die 41 and the punch 42), the short side direction distance W1 between the center portion of the punch long side wall machining part 42*b* in the long side direction and the die long side wall machining part 41*c* is smaller than the short side direction distance W2 between the both end portions of the punch long side wall machining part 42*b* in the long side direction and the die long side wall machining part 41*c*.

In this manner, in the drawing and ironing where deflection occurs in the die long side wall machining part 41*c* due to the shaping reactive force, it is possible to reduce the dimensional difference between the short side direction distance W2 between the die long side wall machining part 41*c* and the punch long side wall machining part 42*b* at both end portions in the long side direction, and the short side direction distance W1 between the die long side wall machining part 41*c* and the punch long side wall machining part 42*b* at the center portion in the long side direction, and thus the thickness distribution of the planned long side wall part 66C can be made more uniform.

In addition, as illustrated in FIG. 6A, the die 41 and the punch 42 are formed such that in the state where the punch 42 is inserted into the die machining through hole 41*a* in an unloaded state, the short side direction distance W1 between the center portion of the punch long side wall machining part 42*b* in the long side direction and the die long side wall machining part 41*c* is smaller than a long side direction distance W3 between the punch short side wall machining part 42*c* and the die short side wall machining part 41*d*.

Note that as illustrated in FIG. 6A and the like, the die machining inner peripheral surface 41*b* and the punch machining outer peripheral surface 42*a* are each line-symmetric in the long side direction and line-symmetric in the short side direction as viewed in the punch movement direction (up-down direction).

In addition, in the drawing and ironing, the punch 42 is inserted into the die machining through hole 41*a* such that the long side direction distances W1 and W2 of the die long side wall machining part 41*c* and the punch long side wall machining part 42*b* on both sides with the punch 42 therebetween in the long side direction are the same, and the distance W3 between the die short side wall machining part

41*d* and the punch short side wall machining part 42*c* on both sides with the punch 42 therebetween in the short side direction is the same.

Figure 3F:
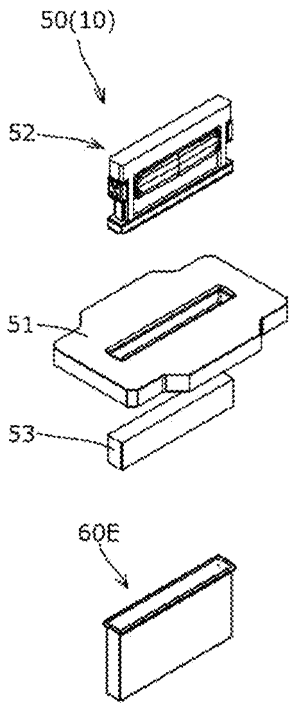

As illustrated in FIG. 3F, the shape correction step is to form a fourth intermediate molded product 60E by increasing (widening) the distance in the short side direction between a pair of planned long side wall parts 66D (the portion that is the long side wall 66 in a state of a final molded product) of the third intermediate molded product 60D obtained by the drawing/ironing step, and planarizing (to a planar state, or performing a planarizing process on) a planned bottom wall part 61D (a portion that is the bottom wall 61 in a state of a final molded product) of the third intermediate molded product 60D.

Figure 9:
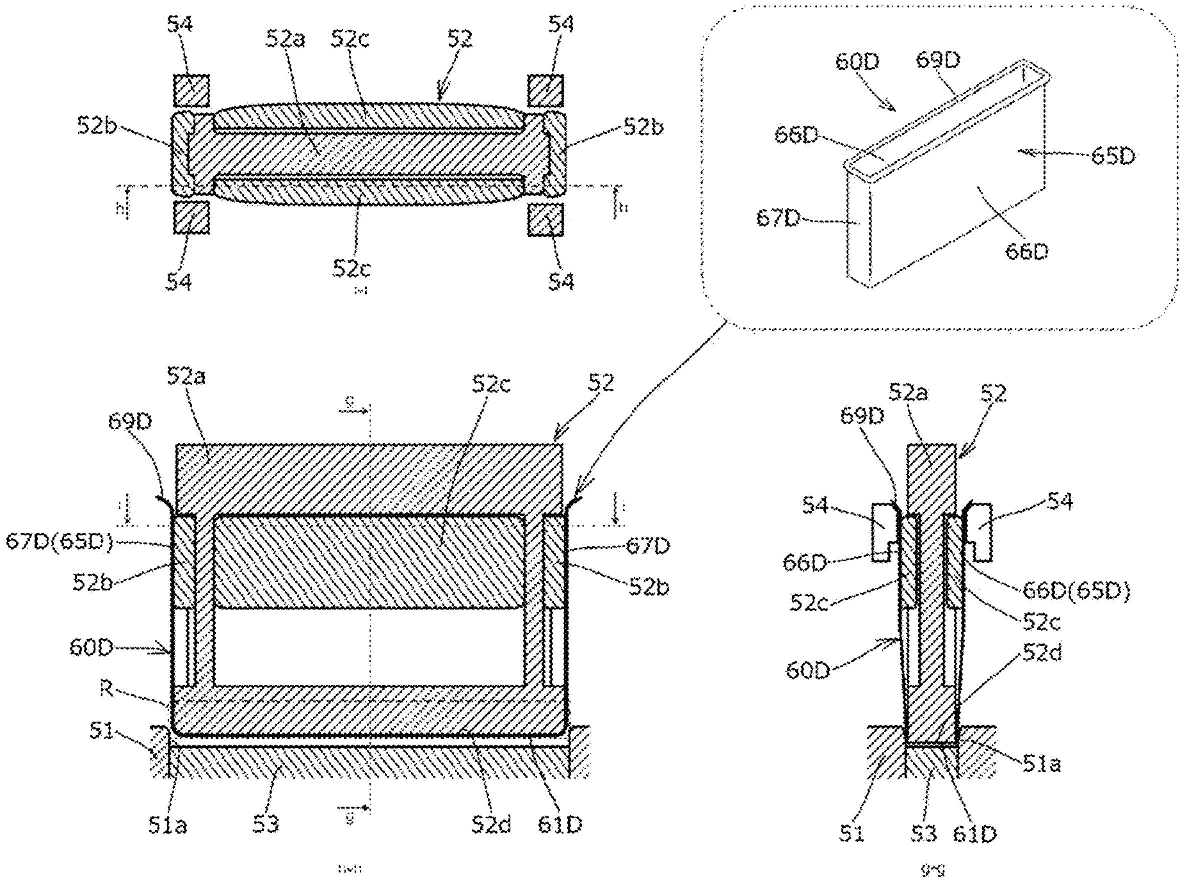
FIG. 9 is an explanatory diagram illustrating the shape correction unit.

As illustrated in FIG. 9, in the shape correction step, the above-described widening process and planarizing process are performed in one step in which in the state where a shape correction punch 52 is inserted in the third intermediate molded product 60D, the third intermediate molded product 60D is pushed (pulled) into a die machining through hole 51*a* with the shape correction punch 52 by moving the shape correction punch 52 relative to a die 51 (in the present embodiment, by moving the shape correction punch 52 with respect to the die 51 provided in the fixed state), and the planned bottom wall part 61D of the third intermediate molded product 60D is sandwiched with the shape correction punch 52 and bottom wall pressing member 53.

Each step of the shape correction step is described in detail below.

Figure 8:
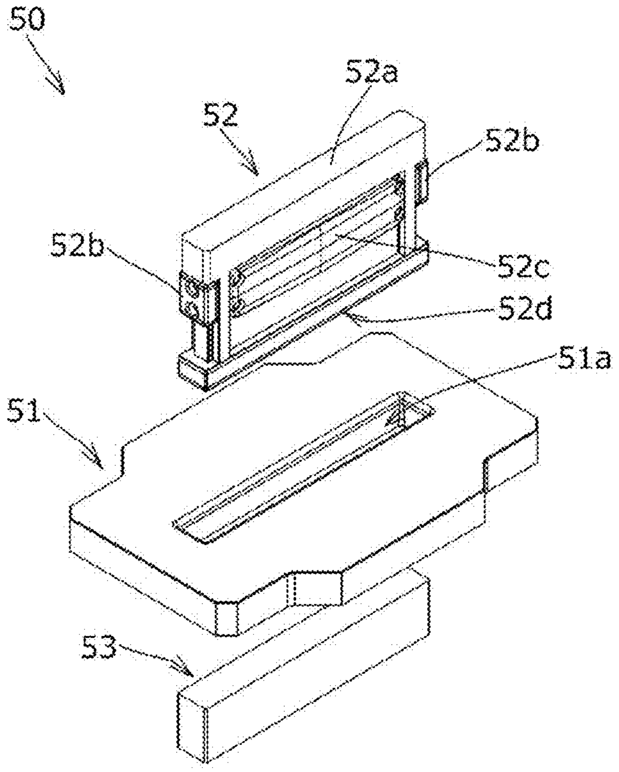
FIG. 8 is an explanatory diagram illustrating a shape correction unit.

First, as illustrated in FIGS. 8 and 9, the widening process is to push and expand into a wedge shape the distance in the short side direction between the pair of planned long side wall parts 66D (particularly between the center portions of the planned long side wall part 66D in the long side direction) by pushing each planned long side wall part 66D (particularly a region near the center portion in the longitudinal direction) outward in the short side direction by a long side wall pressing part 52*c* of the shape correction punch 52 inserted in the third intermediate molded product 60D while preventing a pair of planned short side wall parts 67D from approaching each other with a short side wall side pushing part 52*b* of the shape correction punch 52 inserted in the third intermediate molded product 60D by inserting the shape correction punch 52 into the third intermediate molded product 60D supported by an outside support member 54.

Figure 10:
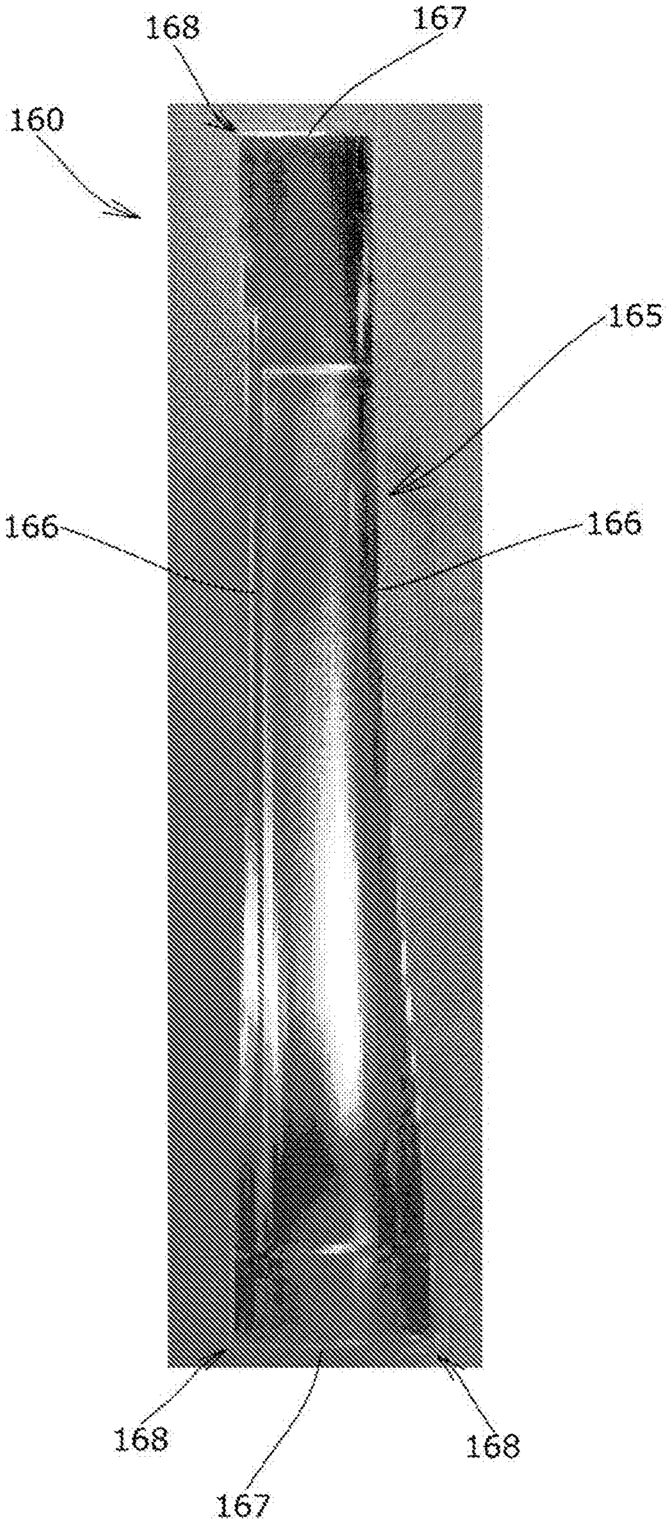
FIG. 10 is an explanatory diagram for describing a canning phenomenon.

Through this widening process, the shape can be corrected even in the case of occurrence of a so-called canning phenomenon in which the center portion of each long side wall 166 in the long side direction is recessed inward in the short side direction as illustrated in FIG. 10.

The short side wall side pushing part 52*b* is disposed to press from the inside the portions on both sides of each planned long side wall part 66D in the long side direction and each planned short side wall part 67D (a portion that is the short side wall 67 in a state of a final molded product) on the opening side of the third intermediate molded product 60D in the state where the shape correction punch 52 is inserted in the third intermediate molded product 60D as illustrated in FIG. 9.

In this manner, the short side wall side pushing part 52*b* has a function of preventing (restricting) the portions on both sides of the pair of planned long side wall parts 66D in the long side direction from approaching each other, and preventing (restricting) the pair of planned short side wall parts 67D from approaching each other in the state where the shape correction punch 52 is inserted in the third intermediate molded product 60D.

Note that the short side wall side pushing part 52*b* may be designed such that in the state where the shape correction punch 52 is inserted in the third intermediate molded product 60D, the distance between the portions on both sides of the pair of planned long side wall parts 66D in the long side direction is pushed and expanded in a wedge shape in the short side direction, and the short side wall side pushing part 52*b* may be designed such that the distance between the pair of planned short side wall parts 67D is pushed and expanded in a wedge shape in the long side direction.

As illustrated in FIG. 9, the short side wall side pushing part 52*b* includes, on the depth side (lower side) in the punch movement direction (up-down direction), a tapered portion that is inclined inward in the long side direction as it moves toward the depth side, and this makes it easier to insert the shape correction punch 52 into the third intermediate molded product 60D.

In addition, in the present embodiment, the short side wall side pushing part 52*b* is composed of a separate member formed separately from a punch body 52*a* and attached and fixed to the punch body 52*a*, and thus the degree of the pressing of the planned long side wall part 66D and the planned short side wall part 67D with the short side wall side pushing part 52*b* can be easily adjusted. However, the short side wall side pushing part 52*b* may be formed integrally with the punch body 52*a*.

The long side wall pressing part 52*c* is disposed to push from the inside the center portion of each planned long side wall part 66D in the long side direction on the opening side of the third intermediate molded product 60D in the state where the shape correction punch 52 is inserted in the third intermediate molded product 60D as illustrated in FIG. 9.

In this manner, the long side wall pressing part 52*c* has a function of pushing and expanding the distance in the short side direction between the pair of planned long side wall parts 66D.

As illustrated in FIG. 9, the long side wall pressing part 52*c* includes a pressing surface with its center portion in the long side direction swollen more outward in the short side direction than its both end portions in the long side direction.

In addition, as illustrated in FIG. 9, the long side wall pressing part 52*c* includes, on the depth side (lower side) in the punch movement direction (up-down direction), a tapered portion that is inclined inward in the short side direction as it moves toward the depth side, and this makes it easier to insert the shape correction punch 52 into the third intermediate molded product 60D.

In addition, in the present embodiment, the long side wall pressing part 52*c* is composed of a separate member formed separately from the punch body 52*a* and attached and fixed to the punch body 52*a*, and thus the degree of the pressing of the planned long side wall part 66D with the long side wall pressing part 52*c* can be easily adjusted. However, the long side wall pressing part 52*c* may be formed integrally with the punch body 52*a*.

Note that in the above-described present embodiment, the short side wall side pushing part 52*b* and the long side wall pressing part 52*c* are disposed at positions corresponding to the opening side (near the opening) of the third intermediate molded product 60D in the state where the shape correction punch 52 is inserted in the third intermediate molded product 60D as illustrated in FIG. 9, but the arrangement of the long side wall pressing part 52*c* and the short side wall side pushing part 52*b* with respect to the third intermediate molded product 60D in the state where the shape correction punch 52 is inserted in the third intermediate molded product 60D is not limited to the above-described arrangement. For example, the short side wall side pushing part 52*b* and the long side wall pressing part 52*c* may be disposed at positions corresponding to the vicinity of the center of the third intermediate molded product 60D in the punch movement direction (up-down direction) in the state where the shape correction punch 52 is inserted.

In addition, the numbers of the short side wall side pushing part 52*b* and the long side wall pressing part 52*c* are also not limited to the illustration in FIGS. 8 and 9. For example, in addition to those illustrated in FIGS. 8 and 9, the short side wall side pushing part 52*b* and the long side wall pressing part 52*c* disposed at positions corresponding to the vicinity of the center of the third intermediate molded product 60D in the punch movement direction (up-down direction) in the state where the shape correction punch 52 is inserted may be additionally provided.

As illustrated in FIG. 9, the outside support member 54 is disposed to support from the lower side a flange part 69D of the third intermediate molded product 60D, and press from the external side the portions on both sides of each planned long side wall part 66D in the long side direction on the opening side (near the opening) of the third intermediate molded product 60D during the widening process.

In this manner, the outside support member 54 has a function of preventing (restricting) the portions on both sides of each planned long side wall part 66D in the long side direction from expanding outward in the short side direction while supporting the third intermediate molded product 60D when inserting the shape correction punch 52 into the third intermediate molded product 60D.

Note that depending on the embodiment, another support member that supports the third intermediate molded product 60D from the external side at a given position may be provided instead of the outside support member 54, or in addition to the outside support member 54.

The planarizing process is to planarize the planned bottom wall part 61D by performing the drawing and ironing over the entire region in the circumferential direction in the vicinity (region R illustrated in FIG. 9) of the connecting part (curved corner portion) between a planned cylindrical part 65D and the planned bottom wall part 61D of the third intermediate molded product 60D in the gap between the die machining inner peripheral surface of the die machining through hole 51*a* formed in the die 51 and the punch machining outer peripheral surface of the shape correction punch 52 inserted into the die machining through hole 51*a* by moving the shape correction punch 52 so as to sandwich the planned bottom wall part 61D with a bottom wall pressing part 52*d* of the shape correction punch 52 inserted in the third intermediate molded product 60D and a bottom wall pressing member 53 disposed on the outer surface side of the planned bottom wall part 61D, and by pushing (pulling) the third intermediate molded product 60D (the planned bottom wall part 61D and a part of the planned cylindrical part 65D in the vicinity of the planned bottom wall part 61D) into the die machining through hole 51*a* with the shape correction punch 52.

The pressing surface of the bottom wall pressing part 52*d* of the shape correction punch 52 and the pressing surface of the bottom wall pressing member 53 that sandwich the planned bottom wall part 61D are each formed in a flat shape.

Note that while the bottom wall pressing part 52*d* of the shape correction punch 52 is formed integrally with the punch body 52*a*, the bottom wall pressing part 52*d* may be composed of a separate member formed separately from the punch body 52*a*.

In addition, the bottom wall pressing member 53 is supported by an air cylinder (not illustrated), and applies an appropriate pressure to the planned bottom wall part 61D by sandwiching the planned bottom wall part 61D between it and the shape correction punch 52 while moving downward together with the punch (the third intermediate molded product 60D) when it is pushed downward by a punch (the third intermediate molded product 60D) during the planarizing process. Note that during the above-described planarizing process, an air cylinder (not illustrated) softens the impact of collision of the punch (the third intermediate molded product 60D) against the bottom wall pressing member 53.

Note that in the above-described first and second drawing steps and drawing/ironing step, the equipment corresponding to the bottom wall pressing member 53 (and the air cylinder) for supporting the outside (lower side) of the planned bottom wall part is not used, that is, the equipment for sandwiching the planned bottom wall part 61D with the punch moving downward is not used.

In the shape correction step in the above-described present embodiment, the shape correction (widening process) of the planned cylindrical part 65D and the shape correction (planarizing process) of the planned bottom wall part 61D can be collectively performed by one step (one operation) of moving the shape correction punch 52 toward the side of the die 51 and the bottom wall pressing member 53 after inserting the shape correction punch 52 into the third intermediate molded product 60D, and thus the shape accuracy of the square can 60 can be improved while suppressing the increase in manufacture burden.

In addition, during the drawing or the drawing and ironing, it is conceivable to suppress the outward swell of the bottom wall with a configuration in which the member disposed on the outside of the planned bottom wall part and the punch sandwich the planned bottom wall part of the intermediate molded product, but such a configuration needs to set a large amount of stroke of the punch for the drawing or the drawing and ironing, and the member disposed on the outside (lower side) of the planned bottom wall part also needs a structure of moving to follow the movement of the punch, thus leading to increase in apparatus cost and reduction in manufacture speed. Since the disclosure, on the other hand, does not need such a structure, the amount of stroke of the bottom wall pressing member 53 can be short, and the increase in apparatus cost and reduction in manufacture speed can be avoided.

In addition, the square can manufacturing method includes various steps other than the above-described steps, such as a washing step and a trimming step of cutting off unnecessary parts in the vicinity of the opening such as a flange part of the fourth intermediate molded product 60E obtained by the shape correction step.

Square Can Manufacturing Apparatus 10

Next, the square can manufacturing apparatus 10 is described below.

As illustrated in FIGS. 2A to 2C and FIGS. 3D to 3F, the square can manufacturing apparatus 10 includes a first drawing unit 20 for performing a first drawing step, the first drawing unit 20 for performing a second drawing step, a drawing/ironing unit 40 for performing a drawing/ironing step, and a shape correction unit 50 for performing a shape correction step.

As illustrated in FIGS. 2A to 2C and FIGS. 3D to 3F, the first and second drawing units 20 and 30 and the drawing/ironing unit 40 include the dies 21, 31 and 41, the punches 22, 23 and 24, the blank holders 23, 33 and 43, and various peripheral equipment such as a supporting member and a driving means composed of an actuator or a motor for driving each part such as the punch.

In addition, as illustrated in FIG. 4, the shape correction unit 50 includes the die 51, the shape correction punch 52, the bottom wall pressing member 53, the outside support member 54, and various peripheral equipment such as a supporting member and a driving means composed of an actuator or a motor for driving each part such as the punch.

Specific configurations and functions of these parts are as described above.

While an embodiment of the disclosure is described in detail above, the disclosure is not limited to the above-described embodiment, and various design changes can be made without departing from the disclosure described in the claims, such as making up the square can manufacturing method and the square can manufacturing apparatus 10 by arbitrarily combining the configurations in embodiments and modifications described above or described below.

For example, while the drawing (or the drawing and ironing) is performed two times prior to the drawing and ironing in the above-described embodiment, the number of times of the drawing (or the drawing and ironing) prior to the drawing and ironing may be one time or three or more times.

In addition, in the above-described embodiment, the die long side wall machining part 41*c* is formed to linearly extend along the long side direction and the punch long side wall machining part 42*b* is formed in an overall shape in which its center in the long side direction is swollen more outward in the short side direction than its both end sides in the long side direction, such that in the state where the punch 42 is inserted into the die machining through hole 41*a* in an unloaded state, the short side direction distance W1 between the center portion of the punch long side wall machining part 42*b* in the long side direction and the die long side wall machining part 41*c* is smaller than the short side direction distance W2 between the die long side wall machining part 41*c* and the both end portions of the punch long side wall machining part 42*b* in the long side direction.

However, the specific configurations of the long side wall machining parts 41*c* and 42*b* are not limited to the above-described configurations as long as the distance W1 is smaller than the distance W2 in the above-described state. For example, in the case where the punch long side wall machining part 42*b* is formed in an overall shape in which its center in the long side direction is swollen more outward in the short side direction than its both end sides in the long side direction, the die long side wall machining part 41*c* may be formed in a shape other than the shape linearly extending along the long side direction (for example, an overall shape in which its center in the long side direction is swollen more outward in the short side direction than its both end sides in the long side direction, or an overall shape in which its center in the long side direction is swollen more inward in the short side direction than its both end sides in the long side direction).

In addition, the distance W1 may be set smaller than the distance W2 in the above-described state by forming the die long side wall machining part 41*c* in an overall shape in which its center in the long side direction is swollen more inward in the short side direction than its both end sides in the long side direction, and in this case the punch long side wall machining part 42*b* may have various shapes such as a shape linearly extending along the long side direction, an overall shape in which its center in the long side direction is swollen more outward in the short side direction than its both end sides in the long side direction, and an overall shape in which its center in the long side direction is swollen more inward in the short side direction than its both end sides in the long side direction.

In addition, in the case where the punch long side wall machining part 42*b* is formed in an overall shape in which its center in the long side direction is swollen more outward in the short side direction than its both end sides in the long side direction, the specific configuration of the punch long side wall machining part 42*b* is not limited to that of the above-described embodiment.

For example, while the machining apex 42*b*-1 is formed as a portion linearly extending along the long side direction in a cross-sectional view in the example illustrated in FIG. 6A, the machining apex 42*b*-1 may be a point-shaped portion in a cross-sectional view as in the modification illustrated in FIG. 6B.

In addition, while the inclined part 42*b*-2 is formed as a portion linearly extending in a cross-sectional view in the example illustrated in FIG. 6A, the inclined part 42*b*-2 may be a curved portion in a cross-sectional view as in the modification illustrated in FIG. 6B, or the inclined part 42*b*-2 may be formed as a portion composed of a combination of one or more straight lines and one or more curves in a cross-sectional view.

Note that in the modification illustrated in FIG. 6B, the punch long side wall machining part 42*b* is formed in a so-called drum shape that is convexly curved outward in the short side direction in its entirety with its center in the long side direction swollen more outward in the short side direction than its both end portions in the long side direction.

Likewise, in the case where the die long side wall machining part 41*c* is formed in an overall shape in which its center in the long side direction is swollen more inward in the short side direction than its both end sides in the long side direction with a machining apex (located innermost in the short side direction in the die long side wall machining part 41*c*) and an inclined part (formed on both sides of the machining apex in the long side direction and inclined to the outside in the short side direction as it moves outward in the long side direction), the machining apex of the die long side wall machining part 41*c* may be formed as a portion linearly extending along the long side direction in a cross-sectional view, or may be formed as a point-shaped portion in a cross-sectional view.

In addition, the inclined part of the die long side wall machining part 41*c* may be formed as a linearly extending portion in a cross-sectional view, or may be formed as a curved portion in a cross-sectional view, or, may be formed as a portion composed of a combination of one or more straight lines and one or more curves in a cross-sectional view.

In addition, while the die short side wall machining part 41*d* and the punch short side wall machining part 42*c* are formed to linearly extend along the long side direction in the above-described embodiment, the machining parts may be formed in other shapes (for example, a curved shape as viewed in the punch movement direction).

In addition, while the die machining inner peripheral surface 41*b* and the punch machining outer peripheral surface 42*a* are formed as surfaces parallel to the punch movement direction (up-down direction) in the above-described embodiment, the specific configurations of the die machining inner peripheral surface 41*b* and the punch machining outer peripheral surface 42*a* are not limited to this.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A quadrangular can manufacturing method of manufacturing a quadrangular can including a bottom wall and a quadrangular cylindrical part with a pair of long side walls and a pair of short side walls, the quadrangular can manufacturing method comprising:

correcting a shape of an intermediate molded product, wherein in the correcting, a distance in a short side direction between planned long side wall parts of the intermediate molded product is expanded by pushing the planned long side wall parts outward in the short side direction by a long side wall pressing part of a shape correction punch inserted in the intermediate molded product, and a planned bottom wall part of the intermediate molded product is planarized by sandwiching the planned bottom wall part between a bottom wall pressing part of the shape correction punch inserted in the intermediate molded product and a bottom wall pressing member disposed on an outer surface side of the planned bottom wall part, wherein the long side wall pressing part includes a pressing surface with a center portion in a long side direction swollen outward in the short side direction.

2. The quadrangular can manufacturing method according to claim 1, wherein in the correcting, when the planned bottom wall part is sandwiched between the shape correction punch and the bottom wall pressing member, the intermediate molded product is pushed into a die machining through hole formed at a die with the shape correction punch, and drawing and ironing are performed on the intermediate molded product in a gap between the die machining through hole and the shape correction punch.

3. The quadrangular can manufacturing method according to claim 1, wherein the long side wall pressing part includes a member formed separately from a punch body and attached to the punch body.

4. A quadrangular can manufacturing apparatus configured to manufacture a quadrangular can including a bottom wall and a quadrangular cylindrical part with a pair of long side walls and a pair of short side walls, the quadrangular can manufacturing apparatus comprising:

a shape correction unit configured to correct a shape of an intermediate molded product, wherein the shape correction unit is configured to expand a distance in a short side direction between planned long side wall parts of the intermediate molded product by pushing the planned long side wall parts outward in the short side direction by a long side wall pressing part of a shape correction punch inserted in the intermediate molded product, and planarize a planned bottom wall part of the intermediate molded product by sandwiching the planned bottom wall part between a bottom wall pressing part of the shape correction punch inserted in the intermediate molded product and a bottom wall pressing member disposed on an outer surface side of the planned bottom wall part, wherein the long side wall pressing part includes a pressing surface with a center portion in a long side direction swollen outward in the short side direction.

* * * * *